United States Patent
Espina et al.

(10) Patent No.: US 7,948,934 B2
(45) Date of Patent: May 24, 2011

(54) TIME-BASED COEXISTENCE METHOD FOR WIRELESS COMMUNICATION

(75) Inventors: Javier Espina, Aachen (DE); Salvador E. Boleko, Aachen (DE); Francesc Dalmases, Barcelona (ES); Thomas Falck, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 780 days.

(21) Appl. No.: 11/997,664

(22) PCT Filed: Jul. 27, 2006

(86) PCT No.: PCT/IB2006/052581
§ 371 (c)(1),
(2), (4) Date: Feb. 1, 2008

(87) PCT Pub. No.: WO2007/015197
PCT Pub. Date: Feb. 8, 2007

(65) Prior Publication Data
US 2008/0232345 A1    Sep. 25, 2008

Related U.S. Application Data

(60) Provisional application No. 60/705,582, filed on Aug. 4, 2005.

(51) Int. Cl.
*H04W 4/00* (2009.01)
*H04B 7/212* (2006.01)

(52) U.S. Cl. .................... 370/328; 370/324

(58) Field of Classification Search .......... 370/324, 370/328
See application file for complete search history.

(56) References Cited

U.S. PATENT DOCUMENTS

| | | | |
|---|---|---|---|
| 7,545,826 B2* | 6/2009 | Sugaya | 370/442 |
| 2002/0061031 A1* | 5/2002 | Sugar et al. | 370/466 |
| 2002/0101839 A1 | 8/2002 | Farley et al. | |
| 2004/0114563 A1* | 6/2004 | Shvodian | 370/347 |
| 2005/0171662 A1* | 8/2005 | Strege et al. | 701/33 |
| 2009/0028090 A1* | 1/2009 | Sim et al. | 370/328 |

FOREIGN PATENT DOCUMENTS

| | | |
|---|---|---|
| EP | 1521476 A1 | 4/2005 |
| WO | 0148937 A2 | 7/2001 |
| WO | 2004049631 A1 | 6/2004 |
| WO | 2005045689 A2 | 5/2005 |

* cited by examiner

Primary Examiner — Kenny S Lin (57) ABSTRACT

A method for facilitating coexistence of wireless technologies competing for the same bandwidth includes, with a first component (14) residing in a first wireless network (20), initializing the first wireless network (20) with a superframe period (38) based on a superframe period (28) of a second wireless network (10) and communicating information over the first wireless network (20) within the Contention Free Period period (46) of the superframe period (38) of the first wireless network (20), and, with a second component (4) residing in the second wireless network (10), communicating information over the second wireless network (10) within the Contention Access Period (44) of the superframe period (38), the Contention Free Period (46) and the Contention Access Period (44) being distinct regions of the superframe period (38) of the first wireless network (20).

22 Claims, 5 Drawing Sheets

TIME-BASED COEXISTENCE METHOD FOR WIRELESS COMMUNICATION

CROSS REFERENCE TO RELATED APPLICATIONS

This application claims the benefit of U.S. provisional application serial no. 60/705,582 filed Aug. 4, 2005, which is incorporated herein by reference.

The following relates to wireless communication. It finds particular application to facilitating coexistence between wireless technologies competing for the same bandwidth.

Continual advances in wireless technology have rendered robust, reliable, and cost-effective means of communication. As a result, many industries have leveraged wireless networks to communicate information. One such industry is the medical industry, which uses various range wireless technologies to wirelessly receive data from sensors residing on patients and wirelessly transmit such data to bedside monitors, centralized monitoring stations, and/or remote locations (e.g., a doctor's home).

As wireless standards are developed and evolve and as wireless networks become more pervasive, the opportunity for different wireless technologies to compete for bandwidth within a similar region increases. Such competition may lead communications executing pursuant to one network protocol to interfere with communications executing pursuant to different network protocols. In some instances, the competing wireless technologies may be associated with different devices, which results in one device interfering with another. In other instances, the competing wireless technologies may reside within the same device. In these instances, the competing wireless technologies interfere with each other when concurrently employed.

By way of example, IEEE 802.15.4 based wireless technologies (e.g., ZigBee) operate in a frequency band that is shared by other technologies such as Digital Enhanced Cordless Telecommunications (DECT). IEEE 802.15.4 based networks operate on one radio channel. An IEEE 802.15.4 superframe typically includes a beacon, a Contention Access Period (CAP), a Contention Free Period (CFP), and, optionally, an inactive period (e.g., as with power-safe configurations). IEEE 802.15.4 devices access shared media using either the contention mechanism Carrier Sense Multiple Access/Collision Avoidance (CSMA/CA) or by transmitting during time slots exclusively reserved for them. An IEEE 802.15.4 coordinator allocates a Guaranteed Time Slot (GTS) within the CFP in response to requests for a time slot. The bandwidth within the CAP is also utilized; however, these time slot are not non-guaranteed and may be used by others.

DECT is based on the Multi Carrier, Time Division Multiple Access, Time Division Duplex (MC/TDMA/TDD) radio access methodology. A DECT network simultaneously operates on different radio channels in which its operating frequency band is split. Each DECT device accesses shared medium by only transmitting in allocated time slots reserved by a DECT base station. A common type of DECT connection is a duplex connection in which a DECT device communicates with its DECT base station using a pair of slots (e.g., downlink and uplink) on one frequency channel. In a downlink slot, the DECT base station transmits data to the DECT device, and in an uplink slot, the DECT device transmits data to the DECT base station. The up and downlink slots are separated by half the length of the DECT frame period. Because DECT technology uses shared frequencies, it periodically scans physical shared channels and maintains a record of channel activity. DECT checks to find available transmission frequency and time slot combinations by monitoring the various frequencies to determine their usage and non-usage. DECT typically avoids channels it deems as busy.

IEEE 802.15.4 and DECT based devices can operate within the same frequency band, for example, the 2.4 GHz band. When both technologies use the same band and are located within overlapping regions, they interfere with each other. Although DECT typically avoids the frequency/time slot combinations it deems as busy, the mostly sporadic and irregular IEEE 802.15.4 transmissions that occur in the CAP period often remain undetected by DECT, which leads to mutual interference.

In view of the aforementioned deficiencies with the coexistence of wireless technologies competing for bandwidth as well as other deficiencies related to the coexistence, there is a need for improved techniques that facilitate such coexistence and overcome the deficiencies therewith.

In one aspect of the invention, a method for facilitating coexistence of wireless technologies competing for the same bandwidth is illustrated. In one instance, the competing wireless technologies include a first wireless network that is based on a time-slotted medium access mechanism and includes a configurable frame with at least a beacon, a Contention Access Period, a Contention Free Period, and, optionally, an inactive period, and a second wireless network that is based on a time-slotted medium access mechanism, uses slot pair channels, with each slot of the pair being about half the slot pair length, periodically scans time slots for interference, and uses free time slots. The method includes, with a first component residing in the first wireless network, initializing the first wireless network with a superframe period based on a superframe period of the second wireless network and communicating information over the first wireless network within the Contention Free Period period of the superframe period of the first wireless network, and, with a second component residing in the second wireless network, communicating information over the second wireless network within the Contention Access Period of the superframe period, and the Contention Free Period and the Contention Access Period being distinct regions of the superframe period of the first wireless network.

One advantage includes facilitating the coexistence of multiple wireless technologies competing for the same bandwidth.

Another advantage resides in splitting a band, dedicating a first portion of the band for one wireless technology, and using another portion for another wireless technology.

Another advantage lies in dynamically allocating time slots based on need.

Another advantage resides in enabling coexistence between synchronized wireless technologies competing for the same bandwidth and non-synchronized wireless technologies competing for the same bandwidth.

Another advantage lies in leveraging easily detected network characteristics to suitably configure multiple wireless technologies competing for the same bandwidth to coexist.

Another advantage is enabling coexistence of multiple wireless technologies competing for the same bandwidth without any hardware modifications to the devices employing the technologies.

Still further advantages will become apparent to those of ordinary skill in the art upon reading and understanding the detailed description of the preferred embodiments.

The drawings are only for purposes of illustrating working embodiments and are not to be construed as limiting the invention.

Figure 1:
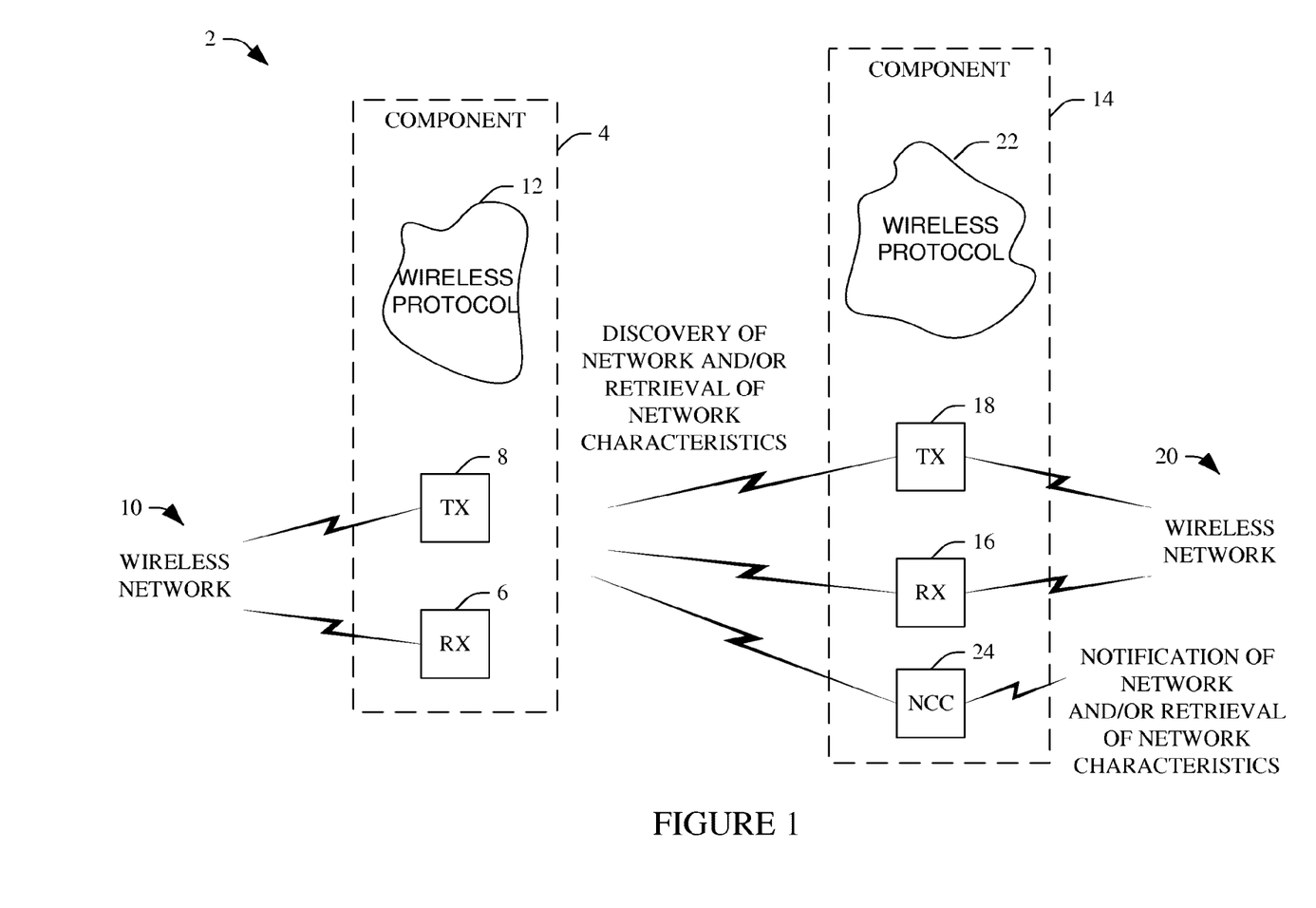
FIG. 1 illustrates a system in which multiple wireless technologies competing for the same bandwidth coexist without interfering with each other.

FIG. 1 illustrates a system 2 in which multiple wireless technologies competing for the same bandwidth coexist without interfering with each other. For sake of brevity, two such wireless technologies executing in different components are illustrated. However, it is to be understood that more than two competing wireless technologies, residing in individual and/or common components and associated with dedicated and/or shared componentry, are contemplated.

A component 4 includes at least a receiver ("RX") 6 and a transmitter ("TX") 8 that communicate over a network 10 via a protocol 12. Although depicted as separate components, the RX 6 and the TX 8 can be part of one or more transducing components. Similarly, a component 14 includes at least a receiver ("RX") 16 and a transmitter ("TX") 18 that communicate over a network 20 via a protocol 22, and the RX 16 and the TX 18 can be part of a single or multiple transducing components.

In a preferred embodiment, at least one of the components 4 and 14 includes a network configuration component ("NCC") 24, and at least the other component 4 and 14 scans for and uses available bandwidth and typically avoids busy or consumed bandwidth. Illustrated is an embodiment in which the NCC 24 resides within the component 14.

In one instance, the NCC 24 periodically (e.g., on demand, at predefined intervals, etc.) scrutinizes a coverage region of the component 14 to determine whether other wireless technologies are concurrently operating within that coverage region. Upon detecting the component 4 is operating within the coverage region, the NCC 24 determines whether the component 4 employs wireless technology that is competing with the wireless network 12 for the same bandwidth. Upon determining the network 10 is a competing network, the NCC 24 requests and/or retrieves (via the RX 16, TX 18, and/or directly) various characteristics of the network 10 and/or the protocol 12. In another instance, the NCC 24 is notified of the coexistence of the wireless network 10 and obtains characteristics thereof by requesting and/or retrieving them from the component 4, local storage, and/or an external source.

The NCC 24 analyzes the characteristics of the wireless network 10 and configures the component 14 such that the component 14 primarily uses a dedicated and/or guaranteed portion of the common bandwidth, while minimally using a shared portion of the common bandwidth, which is made available for communication by the component 4. The percentage of the dedicated, shared, and/or other portions, if any, with respect to the total bandwidth, are configurable and typically are defined based on the particular application. However, there is typically a minimum amount of bandwidth designated as shared for use by the component 4.

As noted previously, the component 4 typically scans for available bandwidth prior to assigning a time slot and transmitting information. During such scanning, the component 4 detects the time slots dedicated for the component 14. In addition, the component 4 determines whether any of the shared portions are available. If enough shared bandwidth is available, the component 4 temporarily allocates a suitable quantity of the available shared bandwidth for the communication. Upon completion (e.g., including successful and unsuccessful) of the communication, the bandwidth is released for additional communications by the component 4, other components, and/or the component 14. The component 4 typically avoids the bandwidth dedicated for the component 14.

By locating competing wireless technologies and configuring itself to primarily use a dedicated portion of common bandwidth, the component 14, via the NCC 24, can facilitate coexistence with wireless technologies that compete for the same bandwidth, wherein such competing technologies scan and use available bandwidth and typically avoid consumed bandwidth.

In order to minimize (including eliminate) erroneous detection by the component 4 of free time slots already assigned, but not in use, the component 14 optionally periodically transmits dummy data. Such transmissions, preferably occurring based on the scan frequency of the component 4 during scanning, are detected by the component 4, and are deemed as busy or consumed time slots by the component 4. As noted above, the component 4 avoids consumed bandwidth and, thus, does not transmit data in the time slots. The foregoing further facilitates coexistence and mitigation of interference.

Figure 2:
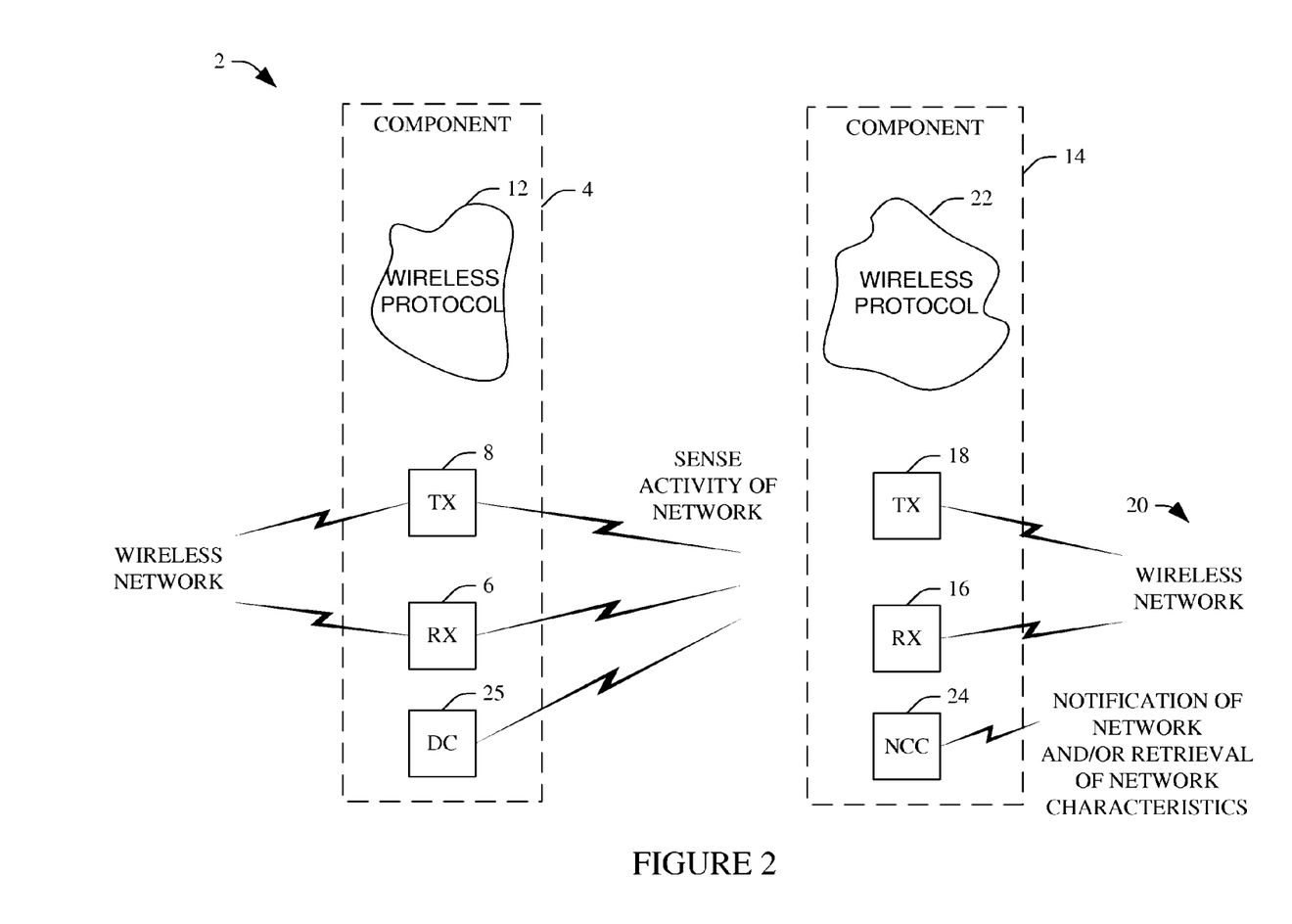
FIG. 2 illustrates an alternative system in which multiple wireless technologies competing for the same bandwidth coexist without interfering with each other.

FIG. 2 illustrates an embodiment in which the component 4 further includes a detection component ("DC") 25 that enhances scanning functionality. The DC 25 senses activity (via the RX 6, TX 8, and/or directly) of the wireless network 20 and/or interprets frames issued by a coordinator of the wireless network 20, which could be the component 14 and/or another component (not shown) residing on the network 20. For foregoing typically is achieved through embedding a radio and/or a partial protocol stack associated with the wireless network 20 within the component 4. This componentry is used to obtain superframe information such as the beginning of one or more different periods within the superframe and/or the duration of the superframe and/or one or more of the different periods therein. This mechanism improves the accuracy and/or the reliability of the component 4 in detecting the wireless network 20.

With respect to FIGS. 1 and 2, the receivers 6 and 16 are used to obtain information via respective networks 10 and 20 for their respective components 4 and 14. For example, the receivers 6 and 16 can be associated with sensors that sense and emit information. Such sensors can reside on an animate object (e.g., a person, a pet, etc.) and sense physiological states of one or more bodily functions. Additionally and/or alternatively the sensors sense location and/or other environmental factors and/or events such as alarm signals, audio, video, etc. In another instance, the sensors are used with inanimate objects such as packages, vehicles, etc. Likewise, the sensors sense location and/or other environmental factors and/or events such as alarms, tampering, audio, video, etc.

Upon receiving such information, the transmitters 8 and 18 may forward the information over their respective networks 10 and 20 to various destinations. Examples of suitable destinations include, but are not limited to, monitoring devices, information repositories, analyzing devices, displaying devices, printing devices, tracking devices, etc. In one embodiment, the transceivers 8 and 18 automatically forward substantially all received information. In another embodiment, the components 4 and 14 include analysis componentry (not shown) that analyzes the information and selectively conveys one or more portions of the received information to one or more other components. Such decision making includes intelligent decisions rendered by various classifiers, inference engines, neural networks, etc. that use probabilities, confidence intervals, likelihoods, cost minimization, statistics, heuristics, etc. to determine what information, if any, should be conveyed, where the information should conveyed, and/or when the information is conveyed.

By way of illustration, the components 4 and/or 14 can be employed in connection with respective clinical monitoring applications. As such, the receivers 6 and 16 receive information from various sensors, including EKG, respiration, blood oxygen, pulse, blood pressure, etc. sensors, that sense physiological information of a subject. In one instance, the sensors periodically emit such information. In another instance, the components 4 and 14 and/or other components elicit the emission of the information. For example, a particular sensor may receive a signal requesting information at a particular point in time. In another instance, the receivers 6 and 16 read the information from sensor storage and/or associated storage.

Upon receiving the information, the receivers 6 and 16 may directly transmit the information to a bedside monitor, a central monitoring station, and/or a clinician, for example. In another instance, the components 4 and 14 analyze the receive information, for example, by comparing characteristics of the information to threshold characteristics, and then making a decision based on a set of rules. For example, if a sensed blood pressure (BP) is greater than a predefined threshold, the BP reading (an optionally other information such as patient ID, etc.) is sent for further analysis and/or to notify others. Several thresholds can be used to provide different levels of discrimination. For instance, if the BP were to cross a first threshold, the BP would be sent to a monitoring station, and if the BP were to cross a second threshold, the BP would additionally or alternatively be sent to a clinician (e.g., email, cell phone, beeper, etc.), etc.

Figure 3:
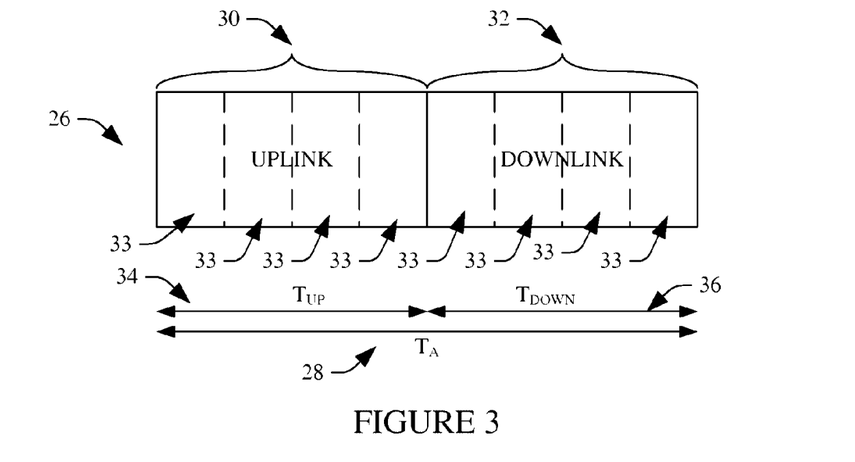
FIG. 3 illustrate typical characteristics of a wireless network used in connection with the systems of FIGS. 1 and 2.
Figure 4:
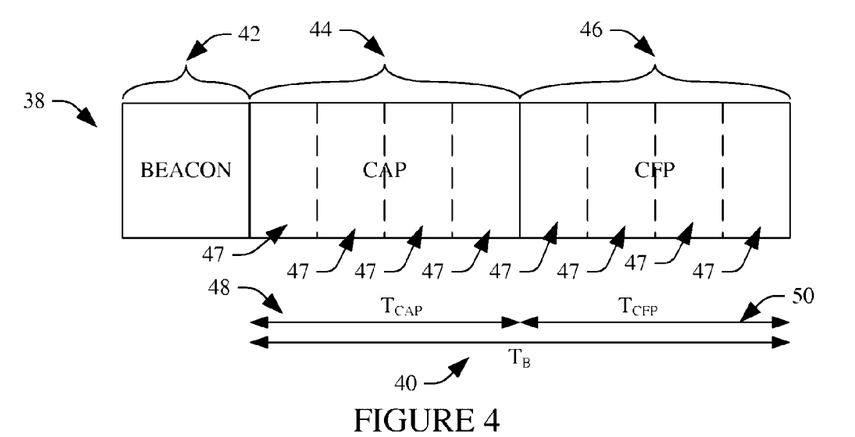
FIG. 4 illustrates typical characteristics of another wireless network used in connection with the systems of FIGS. 1 and 2.
Figure 5:
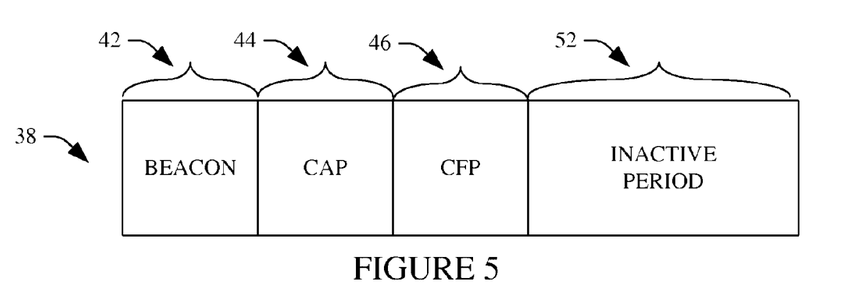
FIG. 5 illustrate typical characteristics of an alternative wireless network used in connection with the systems of FIGS. 1 and 2.

FIGS. 3-5 illustrate various characteristics of suitable wireless networks used with the components 4 and 14. It is to be understood that the following is provided for explanatory purposes and is not limitative.

In a preferred embodiment, the wireless network 10 is based on a time-slotted medium access mechanism in which one or more duplex physical channels are defined by corresponding slot pairs. FIG. 3 depicts a suitable wireless network superframe 26 associated with one such duplex channel. The superframe 26 is associated with a corresponding frame period ("$T_A$") 28. The slot pair includes an uplink slot 30 for transmitting information (e.g., to a base station or other component capable of receiving information based on the first wireless technology) and a downlink slot 32 for receiving information (e.g., from a base station or other component capable of transmitting information based on the first wireless technology). The uplink and downlink slots 30 and 32 each include one or more time slots 33. The uplink slot 30 is associated with a corresponding period ("$T_{up}$") 34, and the downlink slot 32 is associated with a corresponding period ("$T_{DOWN}$") 36. With the wireless protocol 12, periodical time-slot interference scanning is performed, and physical channels detected as busy are avoided.

The wireless network 20 is also based on a time-slotted medium access mechanism. FIG. 4 depicts a suitable wireless network superframe 38 with a corresponding configurable frame period ("$T_B$"). The superframe 38 at least includes a beacon 42, a Contention Access Period ("CAP") 44 in which access to the wireless medium is based on a contention mechanism, and a Contention Free Period ("CFP") 46 in which access to the wireless medium is determined by reservation of time slots. The CAP 44 and the CFP 46 each include one or more time slots 47. The CAP 44 is associated with a corresponding period ("$T_{CAP}$") 48, and the CFP 46 is associated with a corresponding period ("$T_{CFP}$") 50. In an alternative embodiment, the superframe 38 also includes an inactive period 52 for use in networks that execute in a power-safe mode. FIG. 5 illustrates the superframe 38 with the inactive period 52.

Figure 6:
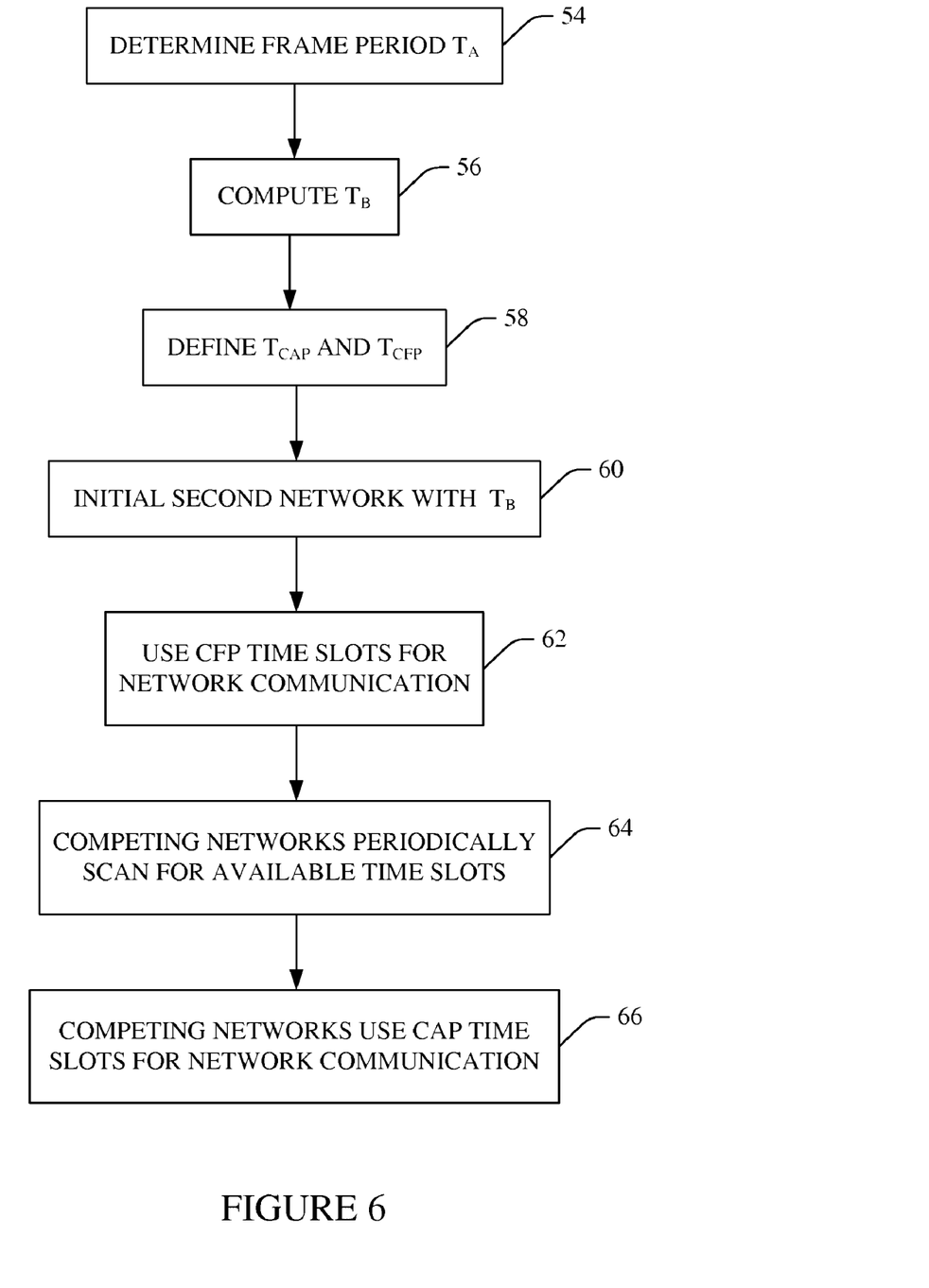
FIG. 6 illustrates a method for facilitating coexistence of networks competing for the same bandwidth without interfering with each other.

Based on the characteristics presented in FIGS. 3-5, the components 4 and 14 perform the acts illustrated in the FIG. 6 to facilitate coexistence. It is to be appreciated that more or less acts can be performed in accordance with aspects of the invention and that the ordering of the acts can vary.

At reference numeral 54, the NCC 24 determines the frame period $T_A$ 28. At 56, the NCC 24 computes the frame period $T_B$ 40 based on the frame period $T_A$ 28. In a preferred embodiment, the frame period $T_B$ 40 is computed as a function of the following: $T_B = T_A/(2*N)$, where N is an integer equal to or greater than one. At 58, the NCC 24 defines $T_{CAP}$ 48 and $T_{CFP}$ 50 based on the maximum number of time slots within the superframe 38. The component 14 primarily uses the CFP 46 for communication and minimally, including not at all, uses the CAP 44 for communication. In a preferred embodiment, the NCC 24 guarantees a minimum $T_{CAP}$ for utilization by the component 4 and/or other components employing the network protocol 12. When the superframe 38 includes an inactive period, the component 4 and/or other components employing the network protocol 12 can also use the inactive period for communication.

At 60, the component 14 and/or an associated network coordinating component (not shown) initializes the network 20, using $T_B$ as the beacon period. At reference numeral 62, the component 14 and/or coordinator handles time slot requests (e.g., Guaranteed Time Slot (GTS) requests) from members of the network 20. Substantially all components residing within the network 20 use their assigned time slot within the CFP 46 for communication. At 64, the component 4 periodically scans time slots for interference prior to allocating time slots for communication. Upon scanning, the component 4 detects busy time slots in the CAP 44, and/or the CFP 46 and/or other information used to determine reserved and/or available time slots. At reference numeral 66, the component 4 subsequently uses the available time slots within the CAP 44 for communication.

Figure 7:
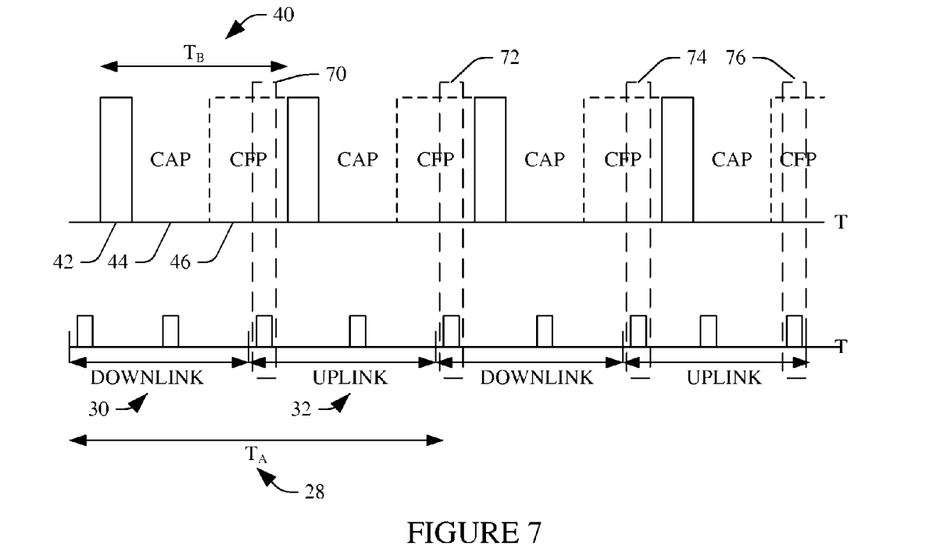
FIG. 7 graphically illustrates two wireless technologies interfering with one another.
Figure 8:
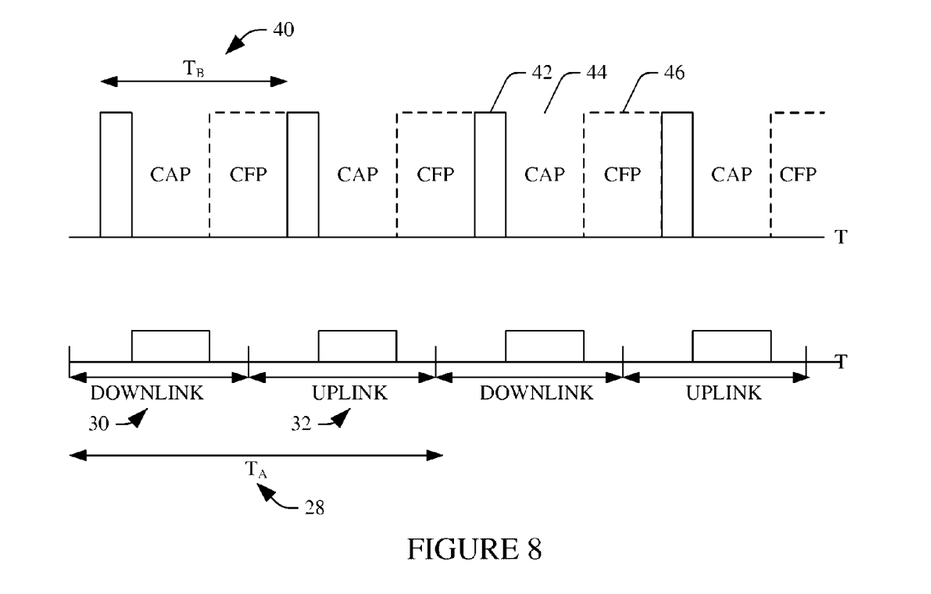
FIG. 8 illustrates a method for self-configuring a device to facilitate coexistence of two wireless technologies competing for the same bandwidth.

FIG. 7 illustrates a scenario in which the components 4 and 14 use conventional techniques (and not the novel approach described herein), resulting in the wireless networks 10 and 20 interfering with each other. Regions of interference are illustrated at 70, 72, 74, and 76, wherein both components 4 and 14 attempt to transmit and/or receive information within the CFP 46. FIG. 8 illustrates a scenario in which the components 4 and 14 act as described herein to mitigate interference and facilitate coexistence between the networks 10 and 20. In FIG. 8, the component 4 uses time slots within the CAP 44 for communication (uplink and downlink), and the component 14 uses time slots within the CFP 46 for communication, thereby enabling coexistence without interference.

The following provides a specific example of coexisting wireless technologies that compete for the same bandwidth. It is to be understood that this example is illustrative and does not limit the invention.

In this example, the wireless network 10 is Digital Enhanced Cordless Telecommunications (DECT) based network. However, any network with similar characteristics can be alternatively employed. For example, the wireless network 10 can be any IEEE 802.15.1 based network such as a Blue-Tooth network. As previously described, a DECT network simultaneously operates on different radio channels in which its operating frequency band is split. Each DECT device accesses shared medium by only transmitting in allocated time slots reserved by a DECT base station. A common type of DECT connection is a duplex connection in which a DECT device communicates with its DECT base station using a pair of slots (e.g., downlink and uplink) on one frequency channel. In a downlink slot, the DECT base station transmits data to the DECT device, and in an uplink slot, the DECT device transmits data to the DECT base station. The up and downlink slots are separated by half the length of the DECT frame period. Because DECT technology uses shared frequencies, it periodically scans physical shared channels and maintains a record of channel activity. DECT checks to find available transmission frequency and time slot combinations by monitoring the various frequencies to determine their usage and non-usage. DECT typically avoids channels it deems as busy.

In this example, the wireless network 20 is based on the IEEE 802.15.4 standard. For example, the wireless network 22 can be a ZigBee network, any RF network, any Wireless Personal Area Network (WPAN), etc. A typical IEEE 802.15.4 superframe at least includes a beacon, a Contention Access Period (CAP), a Contention Free Period (CFP), and, optionally, an inactive period (e.g., as with power-safe configurations). An IEEE 802.15.4 coordinator allocates a Guaranteed time slot (GTS) within the CFP in response to requests for a time slot and announces the allocation in periodic network beacons. The bandwidth within the CAP is also utilized; however, these time slot are not non-guaranteed and may be used by others such as DECT based networked components.

Both DECT and IEEE 802.15.4 networks commonly operate within the same frequency band (e.g., 2.4 GHz). Thus, the networks are susceptible to interfering with each other. By employing the novel techniques described herein for coexistence of networks that compete for the same bandwidth, the DECT and IEEE 802.15.4 coexist within a frequency without and/or with minimal interference.

By way of example, the IEEE 802.15.4 network defines its beacon time period as a function of the superframe period of the DECT network through the following: $T_{IEEE\ 802.15.4} = T_{DECT}/(2*N)$, where $T_{DECT}$ is the superframe period of the DECT network, N is an integer equal to or greater than one, and $T_{IEEE\ 802.15.4}$ is the superframe period of the IEEE 802.15.4 network. $T_{DECT}$ can be obtained as described herein in connection with the component 14.

A Personal Area Network (PAN) coordinator and/or other component (e.g., the component 14) instantiates a beacon-enabled network with the beacon period $T_{IEEE\ 802.15.4}$. The coordinator attends GTS requests from network members reserving GTS for them, as described in the standard. If the network is not associated with an inactive period in its superframe structure, the total amount of GTS that the coordinator allocates preferably is limited to a value between the range of zero and the maximum number of GTS slots pursuant to the IEEE 802.15.4 standard. In a preferred embodiment, the maximum GTS value is defined to be eleven time slots of the sixteen time slots, or about 68.75%, which leaves about 31.25% of the superframe for the CAP. IEEE 802.15.4 network components primarily uses the GTS in the CFG for communications, and minimally uses the CAP, which is used by the DECT network components. DECT networked components regularly scan time slots for interference. As GTS time slots are allocated by the IEEE 802.15.4 coordinator, the DECT network components deem theses time slots as busy, and use the time slots within the CAP.

It is to be appreciated that in order to reduce the frequency of and/or prevent the components on the DECT network from wrongly detecting a free time slot in an already assigned, but not always used, guaranteed time slots, which could lead to interference, the IEEE 802.15.4 network components optionally transmits dummy data in reserved but unused time slots. Typically, transmission of such dummy data does not occur every CFP period. Preferably, such transmissions are based on the scan frequency of the DECT network components.

In addition, the scanning functionality of the DECT network components can be enhanced to sense activity of neighboring IEEE 802.15.4 beacon-enabled network and/or to interpret beacon frames issued by the IEEE 802.15.4 coordinator (e.g., through embedding an IEEE 802.15.4 radio and a partial IEEE 802.15.4 protocol stack), wherefrom information on the beginning of the CFP and/or the duration of the superframe is determined. Such mechanism improves the accuracy and/or reliability of DECT network components in detecting time periods allocated for IEEE 802.15.4 DECT network components in the CFP.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

The invention claimed is:

1. A method for facilitating coexistence of wireless technologies competing for the same bandwidth in which (a) a first wireless network is based on a time-slotted medium access mechanism and includes a configurable frame with at least a beacon, a Contention Access Period, a Contention Free Period, and, optionally, an inactive period, and (b) a second wireless network is based on a time-slotted medium access mechanism, uses slot pair channels with each slot of the pair being about half the slot pair length, periodically scans time slots for interference, and uses free time slots, the method comprising:

with a first component residing in the first wireless network, initializing the first wireless network with a superframe period based on a superframe period of the second wireless network and communicating information over the first wireless network within the Contention Free Period of the superframe period of the first wireless network; and with a second component residing in the second wireless network, communicating information over the second wireless network within the Contention Access Period of the superframe period, the Contention Free Period and the Contention Access Period being distinct regions of the superframe period of the first wireless network.

2. The method as set forth in claim 1, further including:

a detection component, obtaining the superframe period of the second wireless network and computes the superframe period of the first wireless network as a function of the superframe period of the second wireless network.

3. The method as set forth in claim 1, further including:
a detection component that resides in the first wireless network, computing the superframe period of the first wireless network based on the following:

$$T_B = T_A/(2*N),$$

wherein $T_B$ represents the superframe period of the first wireless network, $T_A$ is the superframe period of the second wireless network, and N is an integer equal to or greater than one.

4. The method as set forth in claim 1, further including:
with the first component, defining a Contention Access Period period and a Contention Free Period period for the superframe period of the first wireless network.

5. The method as set forth in claim 1, further including:
reserving the Contention Free Period for communication by components residing on the first wireless network.

6. The method as set forth in claim 1, further including:
with the first component, transmitting dummy information in unused time slots in the Contention Free Period to notify other components scanning for available time slots that the unused time slots are reserved for communication only by components residing on the first wireless network.

7. The method as set forth in claim 1, further including:
defining a minimum number of time slots in the Contention Access Period which ensures that time slots are available for the second wireless network.

8. The method as set forth in claim 1, further including determining at least one of a beginning of the Contention Free Period and a duration of the superframe period of the first wireless network, using componentry of the second component that senses activity of the first wireless network.

9. The method as set forth in claim 1, further including:
with the second component residing in the second wireless network, scanning a frequency band shared with the first component and locating available time slots in the Contention Access Period.

10. The method as set forth in claim 1, wherein the first component is an IEEE 802.15.4 based component and the second component is a DECT based component.

11. An apparatus, comprising:
a first component that resides in a first wireless network, which is based on a time-slotted medium access mechanism, including a configurable superframe with at least a beacon, a Contention Access Period, and a Contention Free Period, the Contention Access Period and the Contention Free Period being distinct;
a second component that resides in a second wireless network, which is based on a time-slotted medium access mechanism, including a superframe period having a plurality of slot channels pairs;
a means for initializings the superframe of the first wireless network based on the superframe period of the second wireless network;
a means for communicating within the Contention Free Period of the superframe of the first wireless network by the first component; and
a means for communicating in free slots in the second wireless network within the Contention Access Period of the superframe of the first network by the second component.

12. A system for facilitating coexistence of wireless technologies competing for the same bandwidth, comprising:
a first component which communicates over an associated first network, the first component including:
a first transmitter which transmits information;
a first receiver which receives information;
a first wireless protocol used by the first transmitter and the first receiver to transmit and receive information, respectively; and
a configuration component that reserves a region within a superframes for its communication and defines another region within the superframes for communication by components employing a different network protocol that competes with the first wireless protocol for bandwidth.

13. The system as set forth in claim 12, wherein the region is a Contention Free region with time slots dedicated for communication by the first component and the another region is a Contention Access region that is shared by one or more competing networks.

14. The system as set forth in claim 12, wherein the configuration component computes the superframe of the first wireless network based on a superframe period of a second wireless network.

15. The system as set forth in claim 14, wherein the superframe of the first wireless network is computed based on the following algorithm:

$$T_B = T_A/(2*N),$$

wherein $T_B$ represents a superframe period of the superframe of the first wireless network, $T_A$ is the superframe period of the second wireless network, and N is an integer equal to or greater than one.

16. The system as set forth in claim 12, wherein the transmitter periodically transmits dummy packets for unused time slots within the region to ensure unused, but reserved time slots are not mistakenly considered available time slots for components residing on a second wireless network.

17. The system as set forth in claim 12, further including a second component which communicates over an associated second network, the second component including:
a second transmitter which transmits information;
a second receiver which receives information;
a second wireless protocol used by the second transmitter and the second receiver to transmit and receive information, respectively;
wherein the second component scans for and uses available time slots within the another region for communication over the second wireless network.

18. The system as set forth in claim 17, wherein the second component further includes:
a detection component that interprets frames associated with first wireless network to determine at least one a beginning of the region and a duration of the superframe.

19. The system as set forth in claim 17, wherein the first component is an IEEE 802.15.4 based component and the second component is a DECT based component.

20. A method for facilitating coexistence of an IEEE 802.15.4 based network and a DECT based network, comprising:
determining, by a component, a superframe of the DECT based network;
computing a superframe of the IEEE 802.15.4 based network as a function of the superframe of the DECT based network;
defining a Contention Free Period within the superframe of the IEEE 802.15.4 based network for communication by one or more devices residing within the IEEE 802.15.4 based network;

defining a Contention Access Period within the superframe of the IEEE 802.15.4 based network for communication by one or more devices residing within the DECT based network;

using the Contention Free Period for communication by the one or more devices residing within the IEEE 802.15.4 based network; and using the Contention Access Period for communication by the one or more devices residing within the DECT based network.

21. The method as set forth in claim 20, wherein the superframe of the IEEE 802.15.4 based network is computed based on the following algorithm:

$$T_{IEEE}802.15.4 = T_{DECT}/(2*N),$$

wherein $T_{IEEE}$ represents a superframe period of the IEEE 802.15.4 based network, $T_{DECT}$ represents a superframe period of the DECT based network, and N is an integer equal to or greater than one.

22. An apparatus for performing the method of claim 20.

* * * * *